United States Patent [19]

Peters, III

[11] 4,445,557

[45] May 1, 1984

[54] COLTER TREE CUTTING SYSTEM

[75] Inventor: Thomas Peters, III, Dublin, Ga.

[73] Assignee: Tree Farmers International, Inc., Dublin, Ga.

[21] Appl. No.: 359,992

[22] Filed: Mar. 19, 1982

[51] Int. Cl.³ .................................................. A01G 23/08
[52] U.S. Cl. ...................................... 144/336; 37/2 R; 37/80 A; 83/928; 171/58; 171/61; 172/111; 144/2 N; 144/34 R
[58] Field of Search .................. 171/58, 61; 37/91, 94, 37/80 A, 2 R; 172/111; 144/3 D, 34 R, 34 E, 2 N, 335, 336, 339; 30/379.5; 83/928

[56] References Cited

U.S. PATENT DOCUMENTS

| 121,846 | 12/1871 | Bussell | 37/80 A |
| 892,895 | 7/1908 | Rose | 144/2 N |
| 1,846,902 | 2/1932 | Powell | 37/91 |
| 3,815,266 | 6/1974 | Schmitz et al. | 37/80 A |

OTHER PUBLICATIONS

John Deere "Log Loaders".
Rome "Feller-Buncher".
Rome "Tree Extractor".

Primary Examiner—W. D. Bray
Attorney, Agent, or Firm—Jones & Askew

[57] ABSTRACT

A method and apparatus for severing trees and other similar objects extending at least partially above and at least partially below the surface of the ground. A frame member which is mountable on a vehicle is moved in a substantially horizontal plane above the surface of the ground. A pair of circular cutting disks having sharpened peripheral edges are rotatably mounted on the frame laterally spaced from each other. The disks are arranged such that the imaginary planes formed by the sharpened edges of the disks are inclined from the surface of the ground and intersect at a point below the surface of the ground, such that the inclined planes have opposite slopes and such that the sharpened edge of one of the disks is substantially adjacent the sharpened edge of the other disk.

14 Claims, 5 Drawing Figures

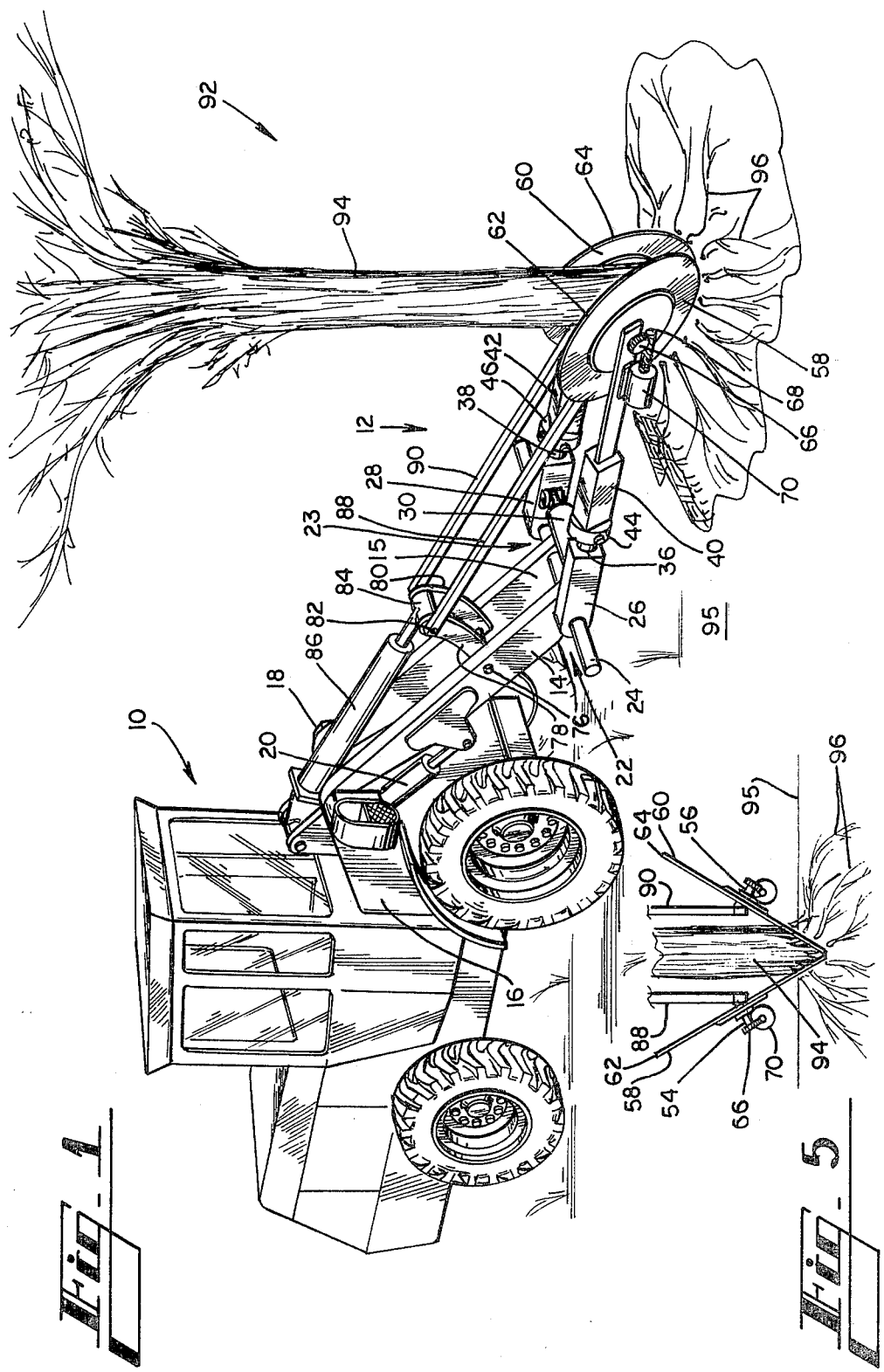

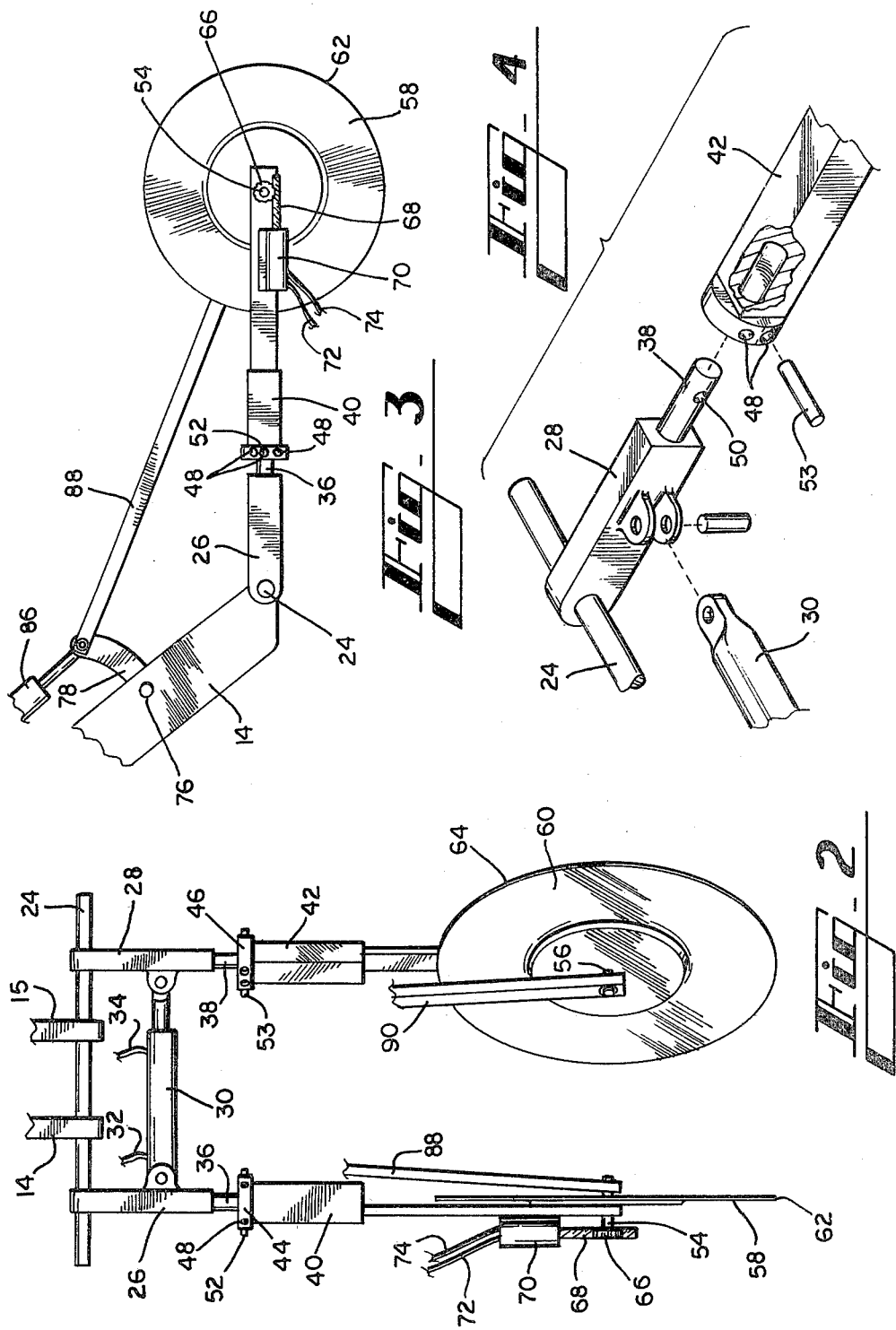

COLTER TREE CUTTING SYSTEM

TECHNICAL FIELD

The present invention relates to a system for cutting trees and other similar objects, and, particularly, to such a system which cuts the tree below the surface of the ground in a continuous operation.

BACKGROUND OF THE INVENTION

In the timber industry, it has long been known that trees can be cut by the use of a conventional saw. Even with powered chain saws, however, the cutting of trees by hand requires a relatively large amount of time and labor. Therefore, a mechanized system for cutting trees has long been sought. The desirability of providing a more efficient system for cutting trees has been previously recognized in U.S. Pat. Nos. 3,364,964; 4,044,804 and 4,282,910 (all incorporated herein by reference). In each of these foregoing patents, the cutting device cuts the tree at a point above the surface of the ground. Such systems are wasteful, however, in that the wood left in the tree stump is not utilized. Furthermore, the tree stump must usually be removed in order to replant an area where the trees have been cut. Accordingly, a mechanism for cutting trees below ground level has also long been sought. U.S. Pat. No. 2,474,037 (incorporated herein by reference) discloses a device for cutting trees and bush below the surface of the ground. This device, however, is not entirely satisfactory for its intended purpose; one of the primary disadvantages being that the removal of trees cannot be performed in a continuous operation.

BRIEF DESCRIPTION OF THE INVENTION

The present invention relates to a method and apparatus for severing trees and other similar objects extending at least partially above and at least partially below the surface of the ground. A frame member which is mountable on a vehicle is moved in a substantially horizontal plane above the surface of the ground. A pair of circular cutting disks having sharpened peripheral edges are rotatably mounted on the frame laterally spaced from each other. The disks are arranged such that the imaginary planes formed by the sharpened edges of the disks are inclined from the surface of the ground and intersect at a point below the surface of the ground, such that the inclined planes have opposite slopes and such that the sharpened edge of one of the disks is substantially adjacent the sharpened edge of the other disk.

Accordingly, it is an object of the present invention to provide an improved method and apparatus for severing trees and other similar objects below the surface of the ground.

Another object of the present invention is to provide a method and apparatus for severing trees and other similar objects in a continuous operation.

These and other objects, features and advantages of the present invention will become apparent after a review of the following detailed description of the disclosed embodiment and the appended drawing and claims.

BRIEF DESCRIPTION OF THE DRAWING

FIG. 1 is a pictorial view of a disclosed embodiment of the tree severing device of the present invention showing the surface of the ground partially broken away to show the underlying root structure of the tree.

FIG. 2 is a detailed partial top view of the tree severing device shown in FIG. 1 showing the cutting disks mounted on the arms.

FIG. 3 is a detailed partial side view of one of the cutting disks and arms shown in FIG. 1.

FIG. 4 is an exploded partial pictorial view of the adjustable joint on the arm shown in FIG. 3, showing the arm partially broken away.

FIG. 5 is a schematic front cross-sectional view of the tree and cutting disks shown in FIG. 1.

DETAILED DESCRIPTION OF THE DISCLOSED EMBODIMENT

Referring now to the drawing in which like numbers indicate like elements throughout the several views, it will be seen that there is a vehicle 10 having a front-mounted articulating arm structure 12 of the type well known in the art, such as is conventionally found on front end loaders and fork lifts. The arm structure 12 includes a pair of central arms 14, 15 pivotally mounted to the vehicle 10 between a pair of laterally spaced mounting brackets 16, 18. A conventional double-action hydraulic cylinder 20 is operably interconnected between a point intermediate the ends of the central arms 14, 15 and the mounting brackets 16, 18. Suitable hydraulic connections, pumps and controls (not shown) permit the selective extension and retraction of the hydraulic cylinder 20 thereby permitting the selective raising and lowering of the ends 22, 23 of the central arms 14, 15 remote from the mounting brackets 16, 18.

Extending between the remote ends 22, 23 of the central arms 14, 15 is a shaft 24. Rotatably and slidably mounted on the shaft 24 are a pair of coupling members 26, 28 laterally spaced from each other. Operatively interconnected between the members 26, 28 is a double-action hydraulic cylinder 30. Hydraulic lines 32, 34 connected to suitable pumps and controls (not shown) permit the selective extension and retraction of the hydraulic cylinder 30 thereby permitting variable lateral separation between the members 26, 28.

Extending forwardly out of the coupling members 26, 28 are shafts 36, 38. The shafts 36, 38 are firmly fixed to the members 26, 28, such as by welding, so that the shafts will not rotate with respect to the coupling members. Rotatably mounted on the shafts 36, 38 are arms 40, 42 respectively. Provided on the ends of the arms 40, 42 adjacent the members 26, 28 are collars 44, 46. A plurality of holes 48, formed for example by drilling, extend diametrically through the collars 44, 46. Corresponding holes 50 are provided in each of the shafts 36, 38 so that the holes 48 in the collars can be axially aligned with the holes in the shafts. Pins 52, 53 removably extend through the holes 48, 50. It will therefore be appreciated that when the pins 52, 53 are removed from the holes 48, 50, the arms 40, 42 are free to rotate on the shafts 36, 38. When the arms 40, 42 are at a desired angular orientation, the pins 52, 53 can be reinserted in the holes 48, 50 thereby securing the arm in the desired orientation.

Rotatably mounted on the arms 40, 42 adjacent the ends thereof remote from the members 26, 28 are shafts 54, 56. Firmly mounted on the shafts 54, 56 for rotation therewith are colters or cutting disks 58, 60. Each cutting disk 58, 60 comprises a circular blade having a sharpened peripheral edge 62, 64 formed by beveling the upper and/or lower surfaces thereof. Mounted on the end of the shafts 54, 56 opposite the cutting disks 58, 60 are gears 66. Engagable with the gears 66 are worm gears 68 which are rotatably drivable by hydraulic motors 70 to which the worm gears are attached. Hydraulic lines 72, 74 connected at one end to the hydraulic motors 70 and at their other end to a suitable hydraulic pump and controls (not shown) thereby permitting the cutting disks 58, 60 to be selectively rotatably driven by the hydraulic motors.

Rotatably mounted on a shaft 76 extending between the arms 14, 15 at a point intermediate their ends is one end of a pair of arms 78, 80. Extending between the arms 78, 80 is a shaft 82 rotatably mounted therewith adjacent the other ends of the arms. Disposed rotatably on the shaft 82 between the arms 78, 80 is a sleeve 84. Operatively interconnected between the sleeve 84 and the ends of the arms 14, 15 adjacent the mountings 16, 18 is a double-acting hydraulic cylinder 86. Suitable connections, pumps and controls (not shown) permit the selective extension and retraction of the hydraulic cylinder 86.

Connected to opposite ends of the shaft 82 by means of a ball and socket joint (not shown), or other similar interconnection means which permits rotation in two planes, is one end of a pair of arms 88, 90. The other ends of the arms 88, 90 are rotatably connected by means of a ball and socket joint (not shown) to the ends of the shafts 54, 56 opposite the ends including the gears 66. It will therefore be appreciated that extension and retraction of the hydraulic cylinder 86 permits the selective raising and lowering of the cutting disks 58, 60.

Use of the present invention will now be considered. The vehicle 10 having the cutting disks 58, 60 extending in front of it is lined up with a row or pine trees similar to the tree 92 (FIG. 1) having a trunk portion 94 extending above the surface of the ground 95 and a root portion 96 extending below the surface of the ground. The hydraulic cylinders 20, 86 are adjusted so that the arms 40, 42 extend substantially horizontally, i.e. substantially parallel to the surface of the ground 95, and slightly above the surface of the ground. When arranged in this manner, it will be appreciated that a portion of the cutting disks 58, 60 will extend below the surface of the ground. The lateral spacing of the arms 40, 42 is adjusted by means of the hydraulic cylinder 30 so that the portion of the cutting disks 58, 60 extending above the surface of the ground are spaced sufficiently far apart so that the trunk portion 94 of the tree 92 can pass therebetween unhindered. The arms 40, 42 are rotated on the shafts 36, 38 and locked in position by means of the pins 44, 46 so that the sharpened edges 62, 64 of the cutting disks 58, 60 are adjacent each other, i.e. almost touching. When in the position shown in FIG. 5, the imaginary planes formed by the sharpened edges 62, 64 of the cutting disks 58, 60 are inclined at an acute angle from the horizontal plane formed by the surface of the ground and have opposite slopes. Furthermore, these imaginary inclined planes intersect at a point below the surface of the ground. Although the precise angle of inclination of the disks to the horizontal plane is not critical, angles of between approximately 30° and 60°, preferably 45° are useful. When thusly arranged the cutting disks provide opposed cutting edges at a point below the surface of the ground.

The vehicle 10 is then driven forward toward the tree 92 so that the sharpened edges 62, 64 of the cutting disks 58, 60 slice through the ground. When the sharpened edges 62, 64 engage the root portion 96 of the tree 92 they sever the root portion of the tree from the trunk portion 94. With the root portion 96 severed from the trunk portion 94, the trunk portion no longer possesses lateral stability and falls over onto the surface of the ground. The vehicle 10 can then be driven toward a next tree in the row without stopping thereby providing a continuous cutting operation.

When cutting relatively soft wood trees, it should be understood that the cutting disks 58, 60 do not have to be rotatably driven by the hydraulic motors 70. The frictional engagement between the surfaces of the cutting disks 58, 60 and the ground as the cutting disks slice through the ground is sufficient to rotate the cutting disks. However, in certain situations, for example when hard wood trees are being cut, the cutting disks 58, 60 can be rotatably driven by means of the hydraulic motors 70 thereby aiding in the cutting operation.

It should be understood, of course, that the foregoing relates only to a preferred embodiment of the present invention and that numerous modifications or alterations may be made therein without departing from the spirit and scope of the invention as set forth in the appended claims.

I claim:

1. A method of severing trees and other similar objects extending at last partially above and at least partially below the surface of the ground, said method comprising the steps of moving a frame member in a substantially horizontal plane above the ground, said frame member including a pair of circular cutting disks having sharpened peripheral edges, said disks being laterally spaced from each other and rotatably mounted on said frame member such that the imaginary planes formed by said sharpened edges of said disks are inclined from said horizontal plane and intersect at a point below the surface of the ground, such that said inclined planes have opposite slopes and such that said sharpened edge of one of said disks is substantially adjacent said sharpened edge of said other disk, and guiding said frame so that relative to said cutting disks the portion of the tree extending below the surface of the ground passes between said adjacent sharpened edges of said disks whereby the portion of the tree extending above the surface of the ground is severed from a portion of the tree extending below the surface of the ground.

2. The method of claim 1 further comprising the step of selectively adjusting the orientation of said disks to vary the inclination of said inclined planes with said horizontal plane.

3. The method of claim 1 further comprising the step of selectively adjusting the orientation of said frame member to vary the height of said frame member above the surface of the ground.

4. The method of claim 1 further comprising the step of selectively adjusting the orientation of said frame member to vary the depth of said adjacent sharpened edges of said disks below the surface of the ground.

5. The method of claim 1 further comprising the step of rotatably driving at least one of said disks.

6. The method of claim 1 wherein the angle between the inclined plane of one disk and the inclined plane of the other disk is approximately 90°.

7. The method of claim 1 wherein the angle between the inclined planes of said disks and the surface of the ground is approximatley 45°.

8. A method of severing trees and other similar objects having trunk portions extending at least partially above the surface of the ground and radially outwardly extended roots extending at least partially below the surface of the ground, said method comprising the steps of moving a frame member in a direction substantially parallel to the surface of said ground, said frame member including a pair of circular cutting disks having sharpened peripheral edges, said disks being laterally spaced from each other and rotatably mounted on said frame member such that said disks are tilted inwardly at the bottom edges thereof and said sharpened edge of one of said disks is substantially adjacent said sharpened edge of said other disk at a position below the surface of the ground, and guiding said frame member so that relative to said cutting disks the root portion of the tree extending below the surface of the ground passes between said adjacent sharpened edges of said disks, whereby said roots are substantially severed from said trunk below the surface of the ground.

9. Apparatus for severing trees and other similar objects having a trunk portion extending above the surface of the ground and a root portion extending below the surface of the grounds, said apparatus comprising:

a pair of circular disk means having peripheral edges for cutting; and frame means for rotatably mounting said disk means at locations laterally spaced from each other such that the imaginary planes formed by said disk means are inclined from a horizontal plane and intersect at a point below the surface of the ground such that said cutting edges of said disk means are substantially adjacent each other and said frame means being mountable to a vehicle for guiding and moving said disk means in a substantially horizontal plane so that, relative to said disk means, the portion of the tree extending below the surface of the ground passes between said adjacent cutting edges of said disk means whereby the portion of the tree extending above the surface of the ground is severed from a portion of the tree extending below the surface of the ground.

10. Apparatus for severing trees and other similar objects having a portion extending above the surface of the ground and a portion extending below the surface of the ground, said apparatus comprising:

a frame member mountable to a vehicle for moving said frame member in a substantially horizontal plane above the surface of the ground;

a pair of disk means rotatably mounted on said frame member at locations laterally spaced from each other for cutting the portion of the tree extending below the surface of the ground when, relative to said disk means, said tree passes between said disk means whereby the portion of the tree extending above the surface of the ground is severed from a portion of the tree extending below the surface of the ground.

11. The apparatus of claim 10 further comprising means for selectively adjusting the orientation of said disk means with respect to said horizontal plane.

12. The apparatus of claim 10 further comprising means for selectively adjusting the orientation of said frame member to vary the height of said frame member above the surface of the ground.

13. The apparatus of claim 10 further comprising means for rotatably driving at least one of said disk means.

14. The apparatus of claim 10 further comprising means for selectively and variably adjusting the lateral spacing between said disk means.

* * * * *